US012304105B2

(12) United States Patent
Schaller et al.

(10) Patent No.: US 12,304,105 B2

(45) **Date of Patent: *May 20, 2025**

(54) TEMPLATE AND SPACING TOOL FOR DECK CONSTRUCTION

(71) Applicant: International Wood Products, LLC, Clackamas, OR (US)

(72) Inventors: Edith Marie Schaller, Oregon City, OR (US); Dustin John Gray, Oregon City, OR (US); Theodore Cooper Searle, III, Tualatin, OR (US)

(73) Assignee: International Wood Products, LLC, Clackamas, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,900

(22) Filed: Mar. 4, 2024

(65) Prior Publication Data

US 2024/0198556 A1 Jun. 20, 2024

Related U.S. Application Data

(63) Continuation of application No. 17/448,201, filed on Sep. 20, 2021, now Pat. No. 11,951,645.

(60) Provisional application No. 63/261,343, filed on Sep. 17, 2021.

(51) Int. Cl.
*B27G 5/02* (2006.01)

(52) U.S. Cl.
CPC .................................... *B27G 5/02* (2013.01)

(58) Field of Classification Search
CPC ......... B27G 5/02; E04G 11/38; E04G 21/003; B25H 7/02; B25H 7/00; B43L 7/005; B43L 7/027
USPC .... 83/746; 33/194, 418, 420, 429, 430, 481, 33/562, 32.2; D10/64, 65
See application file for complete search history.

(56) References Cited

U.S. PATENT DOCUMENTS

| | | | |
|---|---|---|---|
| D27,924 | S | 11/1897 | Kepler |
| 614,175 | A | 11/1898 | Maurer |
| 662,620 | A | 11/1900 | Goff |

(Continued)

OTHER PUBLICATIONS

"Johnson Level & Tool 60-275 Deck Mate, Deck Board Spacing Tool, Orange, 1 Level", Amazon.com, retrieved on Sep. 20, 2021 from https://www.amazon.com/Johnson-Level-Tool-60-275-DeckMate/dp/B0009WG57G/ref=sr_1_2?crid=2SVT1T64A4XBS&keywords=deck+mate&qid=1639504830&s=hi&sprefix=deck-mate%2Ctools%2C225&sr=1-2, 7 pages.

(Continued)

*Primary Examiner* — Ghassem Alie
(74) *Attorney, Agent, or Firm* — Brake Hughes Bellermann LLP

(57) ABSTRACT

In a general aspect, a construction tool can include a template portion arranged in a first plane. The template portion can include a rectangular plate having a slot defined, the slot being angled with respect to an edge of the plate and configured to facilitate marking a cut line on a construction material. The construction tool can also include a base portion arranged in a second plane, the second plane being orthogonal to the first plane. The base portion can include a first portion disposed on a first side of the plate, and a second portion disposed on a second side of the plate of the template portion that is opposite the first side of the plate. The first portion of the base portion can have a first thickness, and the second portion of the base portion having a second thickness that is different than the first thickness.

14 Claims, 7 Drawing Sheets

(56) References Cited

U.S. PATENT DOCUMENTS

| | | | | |
|---|---|---|---|---|
| 768,324 | A | 8/1904 | Breul | |
| D142,946 | S | 11/1945 | Burleigh | |
| 2,551,997 | A | 5/1951 | Cody | |
| 2,949,139 | A | 8/1960 | Nolte | |
| D261,625 | S | 11/1981 | Farino | |
| 4,584,779 | A | 4/1986 | Wakamatsu | |
| 4,742,619 | A | 5/1988 | Swanson | |
| D298,807 | S | 12/1988 | Small | |
| D313,762 | S | 1/1991 | Chan et al. | |
| 4,998,355 | A | 3/1991 | Greene | |
| 5,142,787 | A | 9/1992 | Dadisman | |
| 5,239,762 | A | 8/1993 | Grizzell | |
| D340,653 | S | 10/1993 | Cukon | |
| D355,133 | S | 2/1995 | Vachon | |
| D355,859 | S | 2/1995 | Schroeder | |
| D363,239 | S | 10/1995 | Spirer et al. | |
| 5,456,015 | A | 10/1995 | Butcher et al. | |
| D369,846 | S | 5/1996 | Jones | |
| D374,404 | S | 10/1996 | Kidd | |
| D376,988 | S | 12/1996 | Bruno | |
| 5,727,325 | A | 3/1998 | Mussell | |
| D393,217 | S | 4/1998 | Brickman | |
| D393,218 | S | 4/1998 | Brickman | |
| D397,625 | S | 9/1998 | Pang et al. | |
| 5,813,126 | A | 9/1998 | Dahl | |
| D402,214 | S | 12/1998 | Logwood | |
| D411,469 | S | 6/1999 | Smith | |
| D416,210 | S | 11/1999 | Johnson | |
| D425,437 | S | 5/2000 | Defelice | |
| D428,348 | S | 7/2000 | Hatfield et al. | |
| D434,819 | S | 12/2000 | Hoare | |
| 6,195,904 | B1 | 3/2001 | Greer | |
| D440,889 | S | 4/2001 | Frescas | |
| D445,700 | S | 7/2001 | Mapston | |
| 6,272,758 | B1 | 8/2001 | Wheeler | |
| 6,308,699 | B1 | 10/2001 | Schmitt | |
| D454,312 | S | 3/2002 | Anderson et al. | |
| D460,924 | S | 7/2002 | Hitchcock | |
| 6,494,015 | B1 | 12/2002 | Critchlow | |
| 6,508,244 | B2 | 1/2003 | Lee | |
| D472,825 | S | 4/2003 | Davis | |
| 6,622,394 | B2 * | 9/2003 | Werner | B25H 7/02 33/526 |
| D483,793 | S | 12/2003 | Kitazawa | |
| 6,688,014 | B1 | 2/2004 | Allemand | |
| D490,370 | S | 5/2004 | Picardo | |
| 6,729,033 | B2 | 5/2004 | Jevons et al. | |
| 6,868,616 | B2 | 3/2005 | Allemand | |
| 6,886,268 | B1 | 5/2005 | Morse | |
| D511,961 | S | 11/2005 | Jordan | |
| 7,086,171 | B2 | 8/2006 | Lawson | |
| D557,153 | S | 12/2007 | Light et al. | |
| 7,398,601 | B2 * | 7/2008 | Morrell | B25H 7/00 33/429 |
| D576,059 | S | 9/2008 | Vaughn | |
| D596,054 | S | 7/2009 | Nieto | |
| 7,591,075 | B2 | 9/2009 | McCracken | |
| 7,591,076 | B2 | 9/2009 | Varnedoe | |
| D613,584 | S | 4/2010 | Kelleghan | |
| 7,743,521 | B2 | 6/2010 | Omorrow | |
| D631,523 | S | 1/2011 | Pingalore | |
| D637,501 | S | 5/2011 | Begin et al. | |
| 8,074,368 | B2 * | 12/2011 | Atwood | B25H 7/00 33/465 |
| D659,561 | S | 5/2012 | Liao | |
| 8,371,200 | B2 | 2/2013 | Zhang | |
| D682,123 | S | 5/2013 | Robinson | |
| 8,826,789 | B2 | 9/2014 | Bagley | |
| D717,675 | S | 11/2014 | Lin | |
| D723,701 | S | 3/2015 | Maki et al. | |
| D730,760 | S | 6/2015 | Weaver | |
| D744,876 | S | 12/2015 | Hegarty et al. | |
| D761,641 | S | 7/2016 | Pace et al. | |
| 9,429,424 | B2 | 8/2016 | Butler | |
| D790,370 | S | 6/2017 | Zinkosky | |
| D790,371 | S | 6/2017 | Zinkosky | |
| 9,981,374 | B2 | 5/2018 | Hinz | |
| D850,301 | S | 6/2019 | Elysium | |
| D850,302 | S | 6/2019 | Winans | |
| D866,360 | S | 11/2019 | Mackey et al. | |
| D887,293 | S | 6/2020 | Waldron | |
| D887,873 | S | 6/2020 | Draeger et al. | |
| 11,033,988 | B2 | 6/2021 | Jaffe | |
| D944,103 | S | 2/2022 | Zhou | |
| D945,287 | S | 3/2022 | Xia | |
| D949,719 | S | 4/2022 | Marburger | |
| D954,570 | S | 6/2022 | Turley | |
| D957,964 | S | 7/2022 | Cross | |
| D976,718 | S | 1/2023 | Xia | |
| D981,258 | S | 3/2023 | Wollenburg | |
| D982,462 | S | 4/2023 | Wojciechowski et al. | |
| D982,463 | S | 4/2023 | Wojciechowski et al. | |
| D990,304 | S | 6/2023 | Geiger | |
| 11,679,490 | B2 | 6/2023 | Slocum | |
| D993,048 | S | 7/2023 | Schaller et al. | |
| D1,000,297 | S | 10/2023 | Zhao | |
| D1,001,660 | S | 10/2023 | Skillicorn | |
| D1,005,076 | S | 11/2023 | Hall | |
| D1,007,349 | S | 12/2023 | Selic | |
| D1,008,830 | S | 12/2023 | Wang et al. | |
| D1,016,637 | S | 3/2024 | Zhang et al. | |
| 11,951,645 | B2 | 4/2024 | Schaller et al. | |
| D1,026,684 | S | 5/2024 | Walsh et al. | |
| D1,030,519 | S | 6/2024 | Ervin et al. | |
| D1,030,520 | S | 6/2024 | Johnson | |
| D1,046,652 | S | 10/2024 | Wen | |
| 2002/0035909 | A1 | 3/2002 | Poole et al. | |
| 2002/0053142 | A1 | 5/2002 | Brunetti | |
| 2003/0070310 | A1 | 4/2003 | Werner et al. | |
| 2007/0277387 | A1 | 12/2007 | Morrell | |
| 2009/0139104 | A1 | 6/2009 | Rohweder | |
| 2012/0227275 | A1 | 9/2012 | Goldrick et al. | |
| 2012/0266471 | A1 | 10/2012 | Chao | |
| 2013/0227846 | A1 * | 9/2013 | Buzzell | B43L 7/0275 33/32.2 |
| 2014/0090261 | A1 | 4/2014 | Jones | |
| 2015/0047213 | A1 | 2/2015 | Varney | |
| 2016/0271789 | A1 | 9/2016 | Foster | |
| 2017/0009472 | A1 | 1/2017 | Myers | |
| 2017/0043454 | A1 | 2/2017 | Furey | |
| 2023/0088802 | A1 | 3/2023 | Schaller et al. | |
| 2023/0322012 | A1 | 10/2023 | Mcgee | |

OTHER PUBLICATIONS

"Swanson Tool Co T0118 Composite Speedlite Square Layout Tool, Orange, made of High Impact Polystyrene", Amazon.com, retrieved on Sep. 20, 2021 from https://www.amazon.com/Swanson-Tool-T0118-Speedlite-Square/dp/B0002YS7JU/ref=asc_df_B0002YS7JU/?tag=hyprod-20&linkCode=df0&hvadid=309760780746&hvpos=&hvnetw=g&hvrand=8985296744291211162&hvpone=&hvptwo=&hvqmt=&hvdev=, 9 pages.

"Swanson Tool Co T0701 12-Inch Composite Speedlite Square Layout Tool, Orange, made of High Impact Polystyrene", Amazon.com, retrieved on Sep. 20, 2021 from https://www.amazon.com/Swanson-Tool-T0701-Speedlite-Structural/dp/B0008JF0TE/ref=pd_lpo_1?pd_rd_i=B0008JF0TE&psc=1, 9 pages.

"Swanson Tool Company 4-½ inch Swanson Trim Speed Square", Lowe's, retrieved on Sep. 20, 2021 from https://www.lowes.com/pd/Swanson-Tool-Company-4-1-2-inch-Swanson-Trim-Speed-Square/5001844361, 4 pages.

* cited by examiner

TEMPLATE AND SPACING TOOL FOR DECK CONSTRUCTION

CROSS-REFERENCE TO RELATED APPLICATIONS

This application is a continuation of, and claims priority to, U.S. patent application Ser. No. 17/448,201, filed on Sep. 20, 2021, entitled "TEMPLATE AND SPACING TOOL FOR DECK CONSTRUCTION AND METHODS OF USE", which claims priority to U.S. Patent Application No. 63/261,343, filed on Sep. 17, 2021, entitled "TEMPLATE AND SPACING TOOL FOR DECK CONSTRUCTION AND METHODS OF USE", the disclosures of which are incorporated by reference herein in their entirety.

TECHNICAL FIELD

This disclosure is related to construction tools. More specifically, this disclosure is related to a template and spacing tool for deck construction.

BACKGROUND

Construction can be expensive and time consuming. For instance, constructing a deck, such as for a family residence or business establishment, can require a variety of tools for completing different construction tasks, as well as the use of spacer components for properly spacing decking boards, which adds to overall material. Accordingly, tools that simplify the construction process and/or reduce costs, e.g., materials and/or labor, are desirable.

SUMMARY

In a general aspect, a construction tool can include a template portion arranged in a first plane. The template portion can include a plate having a slot defined therein. The plate can be rectangular in shape. The slot can be angled with respect to an edge of the plate and configured to facilitate marking a cut line on a construction material. The construction tool can also include a base portion that is arranged in a second plane. The second plane can be orthogonal to the first plane. The base portion can have a first portion disposed on a first side of the plate of the template portion, and a second portion disposed on a second side of the plate of the template portion that is opposite the first side of the plate. The first portion of the base portion can have a first thickness. The second portion of the base portion can have a second thickness that is different than the first thickness.

Implementations can include one or more of the following features. For example, the slot can be a first slot that is configured to facilitate marking a 45 degree miter cut line. The plate of the template portion can have a second slot defined therein. The second slot can be configured to facilitate marking a first 22.5 degree miter cut line. The plate of the template portion can have a third slot defined therein. The third slot can be configured to facilitate marking a second 22.5 degree miter cut line. The first slot can be angularly disposed between the second slot and third slot.

The rectangular shape of the plate of the template portion can be a square.

The first portion of the base portion can be configured for spacing decking material of a first type. The second portion of the base portion can be configured for spacing decking material of a second type. The base portion can include a step between its first portion and its second portion.

The first side of the plate of the template portion can include markings indicating the thickness of the second base portion. The second side of the plate of the template portion can include markings indicating the thickness of the first base portion.

The plate of the template portion can have a plurality of screw hole guides defined therein. The plurality of screw hole guides can be configured to facilitate pre-drilling screw holes for mounting decking material. The plurality of screw hole guides can include a first pair of screw hole guides each disposed at a first distance from an edge of the plate of the template portion, and a second pair of screw hole guides each disposed at a second distance from the edge of the plate of the template portion. The second distance can be greater than the first distance.

The edge of the plate of the template portion can be a first edge of the plate of the template portion. The plurality of screw hole guides can include a third pair of screw hole guides each disposed at the first distance from a second edge of the plate of the template portion that is opposite the first edge of the plate of the template portion, and a fourth pair of screw hole guides each disposed at the second distance from the second edge of the plate of the template portion.

In another general aspect, a construction tool can include a template portion arranged in a first plane. The template portion can include a plate that is rectangular in shape. The plate can have a first slot defined therein. The first slot can be configured to facilitate marking a cut line at a first angle on a construction material. The plate can also have a second slot defined therein. The second slot can be configured to facilitate marking a cut line at a second angle on the construction material. The plate can further have a plurality of screw hole guides defined therein. The plurality of screw hole guides can be configured to facilitate pre-drilling screw holes in the construction material. The construction tool can also include a base portion arranged in a second plane. The second plane can be orthogonal to the first plane. The base portion can have a first portion disposed to a first side of the plate of the template portion, and a second portion disposed to a second side of the plate that is opposite the first side of the plate. The first portion of the base portion can have a first thickness. The second portion of the base portion can have a second thickness that is greater than the first thickness.

Implementations can include one or more of the following features. For example, the plate of the template portion can have a third slot defined therein. The third slot can be configured to facilitate marking a miter cut line at a third angle on the construction material. The first slot can be arranged along a 45 degree diagonal in the plate of the template portion. The second slot can be arranged at a 22.5 degree angle with a first edge of the plate of the template portion. The third slot can be arranged at a 22.5 degree angle with a second edge of the plate of the template portion. The second edge of plate of the template portion can be at a 90 degree angle with the first edge of the plate of the template portion.

The plurality of screw hole guides can include a first pair of screw hole guides each disposed at a first distance from an edge of the plate of the template portion, and a second pair of screw hole guides each disposed at a second distance from the edge of the plate of the template portion. The second distance can be greater than the first distance. The edge of the plate of the template portion can be a first edge of the plate of the template portion. The plurality of screw hole guides can include a third pair of screw hole guides each disposed at the first distance from a second edge of the plate of the template portion that is opposite the first edge of the plate of the template portion, and a fourth pair of screw hole guides each disposed at the second distance from the second edge of the plate of the template portion.

The base portion can be monolithically integrated with the template portion.

In another general aspect, a method for constructing a deck can include placing a first decking board in a desired position on a sub-structure of the deck, placing a second decking board adjacent the first decking board, and placing a planar template portion of a construction tool on an upper surface of the first decking board or an upper surface of the second decking board. The planar template portion can be placed such that a first portion of a base of the construction tool is disposed between an edge of the first decking board and an edge of the second decking board, and a second portion of the base extends away from the first decking board and the second decking board. The first portion of the base can have a thickness that is different than a thickness of the second portion of the base. The method can further include arranging the second decking board such that the edge of the first decking board is in contact with a first side of the first portion of the base and the edge of the second decking board is in contact with a second side of the first portion of the base. The method can also include, after arranging the second decking board, attaching the second decking board to the sub-structure of the deck.

Implementations can include one or more of the following features. For example, the method can include attaching the first decking board to the sub-structure of the deck prior to placing the second decking board adjacent to the first decking board.

The method can include pre-drilling screw holes in the second decking board using a pair of screw hole guides defined in the planar template portion at a same distance from an edge of the planar template portion. Attaching the second decking board to the sub-structure of the deck can include attaching the second decking board to the sub-structure with respective screws inserted in the pre-drilled screw holes.

The method can include, prior to attaching the second decking board to the sub-structure, marking a miter cut line on the second decking board using one of a plurality of slots defined in the planar template portion of the construction tool, and miter cutting the second decking board based on the miter cut line.

Placing the planar template portion of the construction tool can includes identifying a type of material of the first and second decking boards, and selecting, based on the type of material, an orientation of the planar template portion, such that a thickness of the first portion of the base in the selected orientation corresponds with a desired spacing for the identified type of material.

Figure 1:
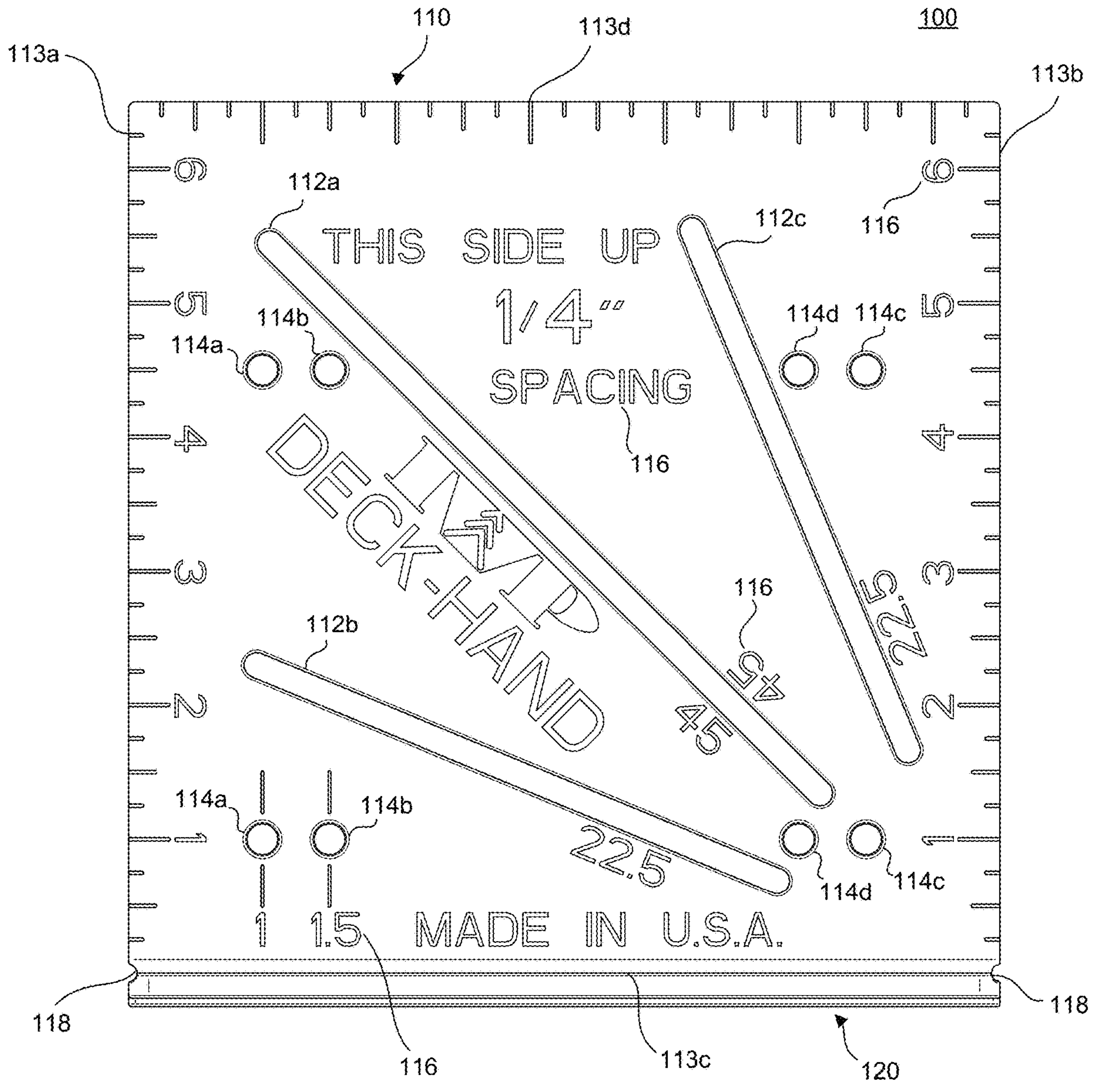
FIG. 1 is a diagram illustrating a front-side view of an example template and spacing tool (e.g., construction tool or tool) that can be used for deck construction.

In the drawings, which may not necessarily be to scale, reference numbers for like or similar elements may not be shown for each of those elements. Also, reference numbers from one view of a given implementation may not be repeated in the related views. Further, in some instances, for purposes of comparing different views, reference numbers from one view of a given implementation may be repeated in other views, but may not be specifically discussed with respect to each view.

DETAILED DESCRIPTION

This disclosure is directed to tools that can simplify and/or reduce construction costs, particularly for deck construction. For instance, the implementations described herein can provide for accurately and efficiently space decking boards of different material types, which can eliminate the need for using spacer components to accurately space decking boards and, accordingly, can reduce material costs. Further, the implementations described herein can be used to perform a number of construction tasks in addition to spacing decking boards, such as marking cut lines for forming miter cuts, and pre-drilling screw holes in decking boards to facilitate attachment of the decking boards to a sub-structure using screws inserted in the pre-drilled holes.

Example implementations can include a template portion and a base portion. In such implementations, the template portion can be formed as a rectangular, or square plate that extends (e.g., orthogonally extends) from the base portion. The template portion and the base portion can each include respective features that facilitate performing various constructions tasks, such as those tasks described above, which can reduce a number of tools that are used when constructing a deck and, as a result, can reduce complexity, cost and construction time.

Figure 2:
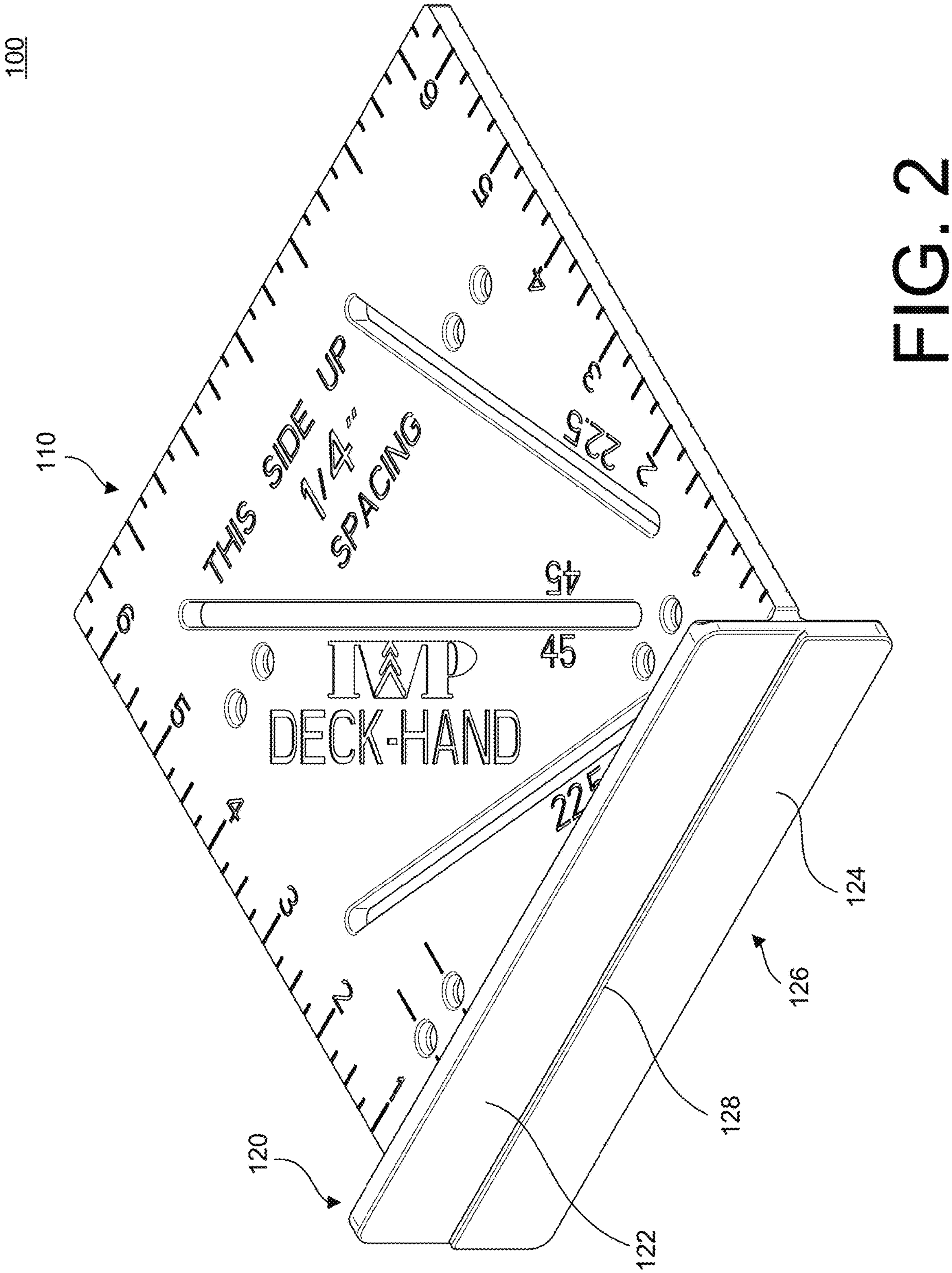
FIG. 2 is a diagram illustrating a perspective view of the tool shown in FIG. 1.
Figure 3:
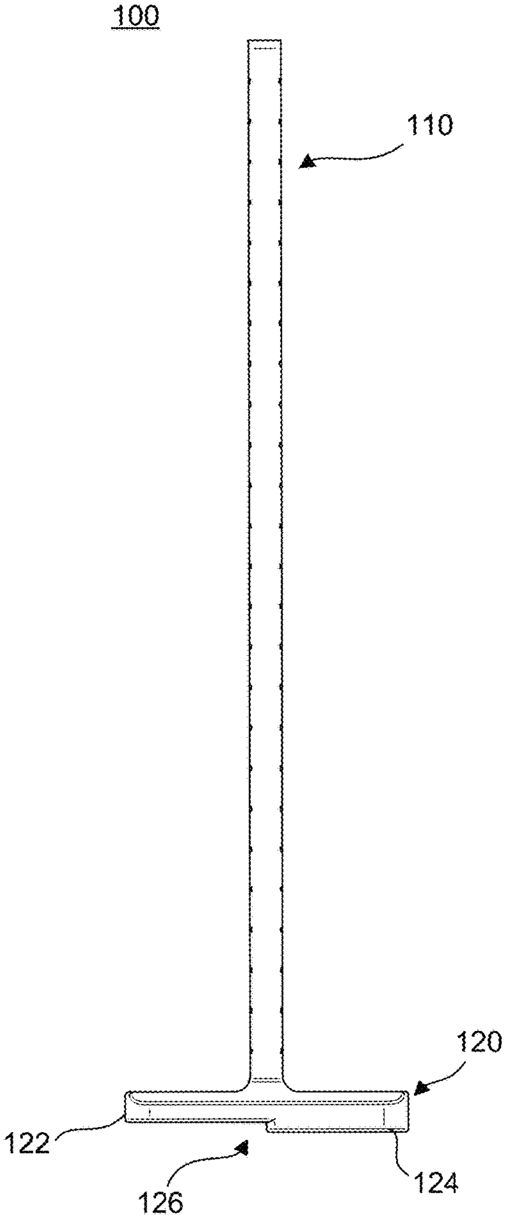
FIG. 3 is a diagram illustrating a right-side view of the tool shown in FIG. 1.
Figure 4:
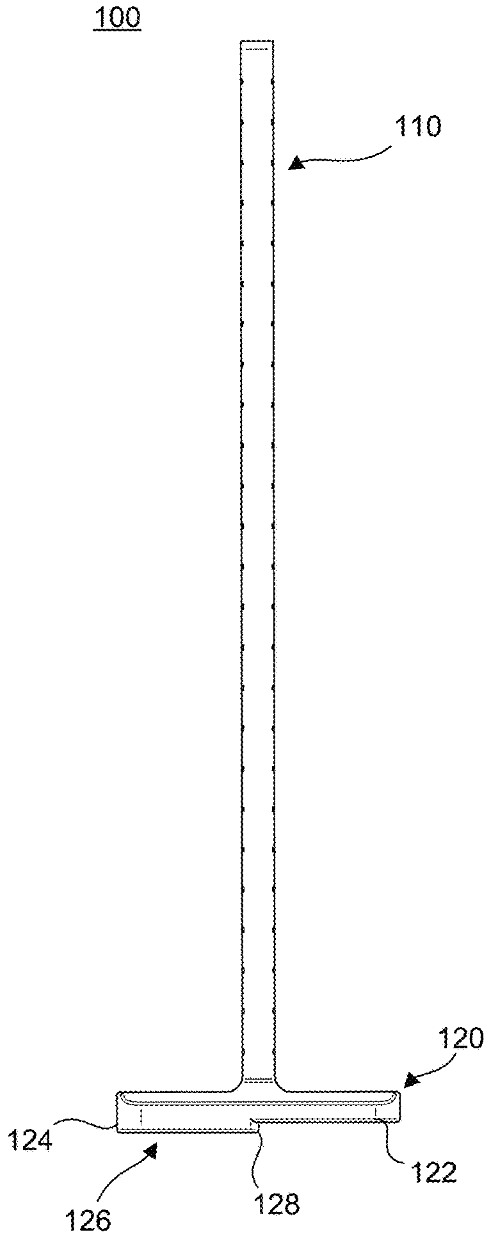
FIG. 4 is a diagram illustrating a left-side view of the tool shown in FIG. 1.
Figure 5:
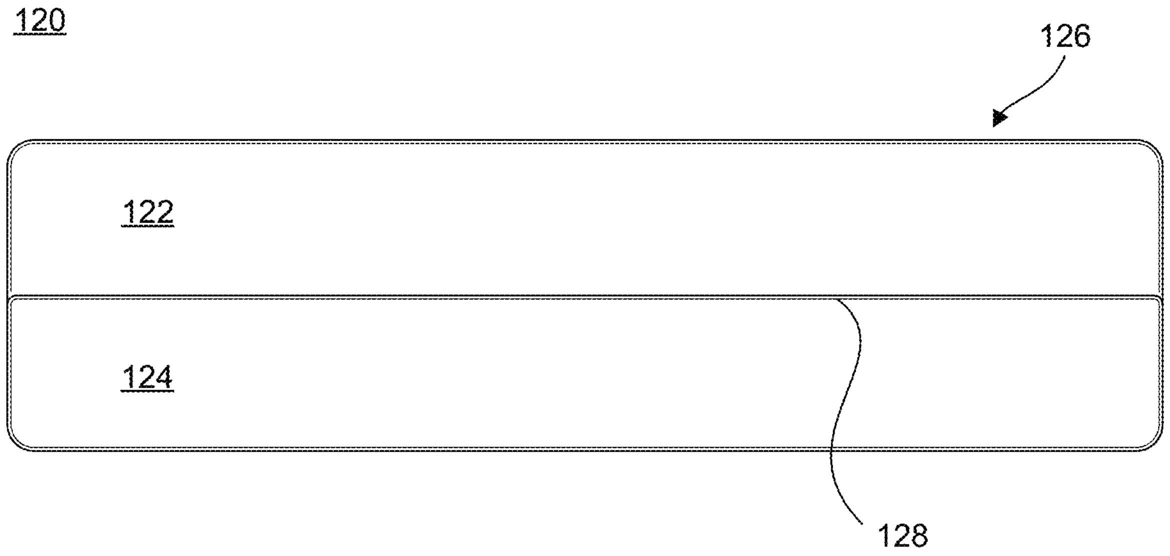
FIG. 5 is a diagram illustrating a bottom-side view of the tool shown in FIG. 1.
Figure 6:
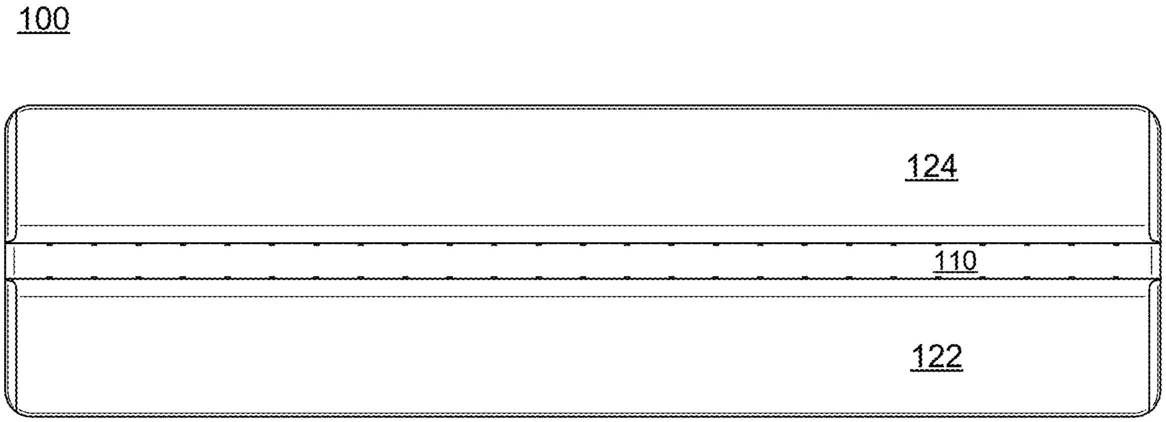
FIG. 6 is a diagram illustrating a top-side view of the tool shown in FIG. 1.
Figure 7:
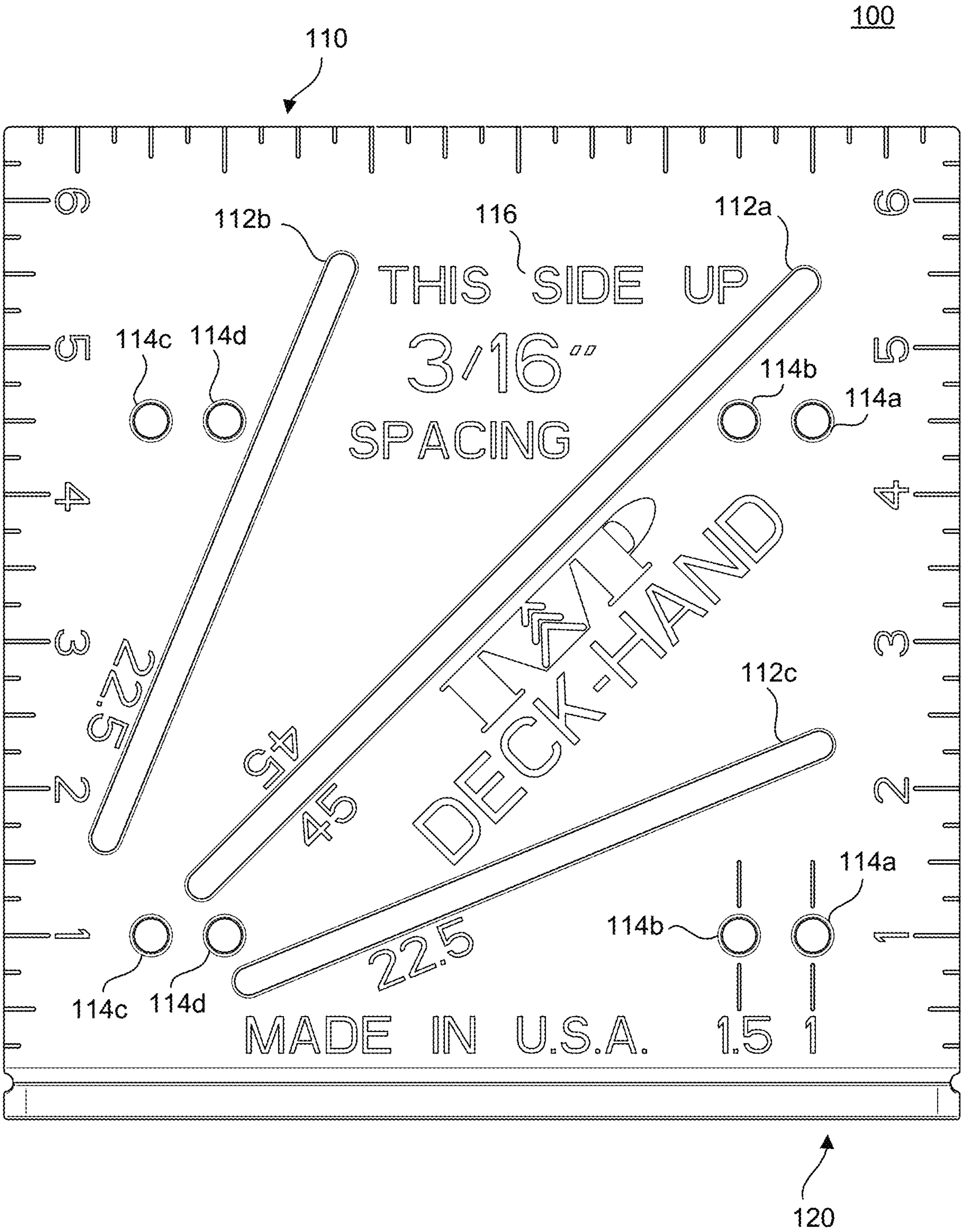
FIG. 7 is a diagram illustrating a back-side view of the tool show in FIG. 1.

FIGS. 1-7 illustrate various views of an example template and spacing tool 100 that can be used for performing various construction tasks, such as those described herein. For instance, the tool 100 can be used during deck construction, such as to facilitate efficient installation of decking boards on a sub-structure. Specifically, FIG. 1 is a diagram illustrating a front-side view of the tool 100. In other implementations, the view shown in FIG. 1 could be referred to as a first side, a second side, a back side, etc. FIG. 2 is a diagram illustrating a perspective view of the tool 100. FIG. 3 is a diagram illustrating a right-side view of the tool 100. FIG. 4 is a diagram illustrating a left-side view of the tool 100. FIG. 5 is a diagram illustrating a bottom-side view of the tool 100. FIG. 6 is a diagram illustrating a top-side view of the tool 100. FIG. 7 is a diagram illustrating a back-side view of the tool 100. In other implementations, the view shown in FIG. 7 could be referred to as a first side, a second side, a back side, etc. In the following discussion, dimensions, distances and angles of the various features of the tool 100, as well as the number of each of the various features that are included in the tool 100, are given by way of example. In other implementations, other dimensions, distances and angles (e.g., for the described slots), as well as different numbers (e.g., none, fewer or more) of the described features can be included in a template and spacing tool.

Referring to FIG. 1, in this example, the tool 100 includes a template portion 110 and a base portion 120. The template portion 110 can be formed as a plate that is rectangular, or square in shape. In other implementations, the template portion 100 can have other shapes. The template portion 110 can be coupled with, and extend from the base portion 120. In some embodiments the template portion 110 and the base portion 120 can be unitarily or monolithically formed. For instance, the template portion 110 and the base 120 of the tool 100 can be formed from a single piece of material, which can be plastic, metal, cured resin, or any other appropriate material. In other embodiments, the base portion 120 can be coupled to the template portion 110 via known methods. As shown in FIG. 1, a notch 118 can be disposed between the template portion 110 and the base portion. In this example, the notch 118 is curved. In other implementations, the notch 118 can have other shapes, or can be omitted.

In the example of FIG. 1, the template portion 110 is arranged in a first plane, e.g., a plane defined by the X-axis and Y-axis of the XYZ-reference axes shown FIG. 1. Also in the example of FIG. 1 the base portion 120 of the tool 100 is arranged in a second plane, such as a plane defined by the X-axis and the Z-axis of the XYZ-reference axes in FIG. 1. That is, in this example, the plane of the template portion 110 extends (e.g., orthogonally extends) from the plane of the base portion 120.

As shown in FIG. 1, the template portion 110 includes plurality of slots 112*a*, 112*b* and 112*c*, which can referred to as angular slots when referenced to one or more of edges 113*a*, 113*b*, 113*c* and 113. The slots 112*a*-112*c*, which in this example are linear slots, can facilitate marking construction materials, e.g., using a writing implement or scribe, as guide for making miter cuts at various angles, such as for forming corners, or other features. For example, in the tool 100, the slot 112*a* is arranged along a 45 degree diagonal of the template portion 110. That is, the slot 112*a* defines a 45 degree angle with each of the sides 113*a*-113*d* of the template portion 110. Also in the tool 100, the slot 112*b* defines a 22.5 degree angle with the edge 113*c* of the template portion 110 that is coupled with the base portion 120, while the slot 112*c* defines a 22.5 degree angle with the edge 113*b* of the template portion. As shown in FIG. 1, the edges 113*b* and 113*c* define a right (90 degree) angle. with the tool 100 properly placed on a decking board, the slots 112*a*-112*c* can facilitate marking the decking board for corresponding miter cuts. In this example, the two slots 112*b* and 112*c* allow for flexibility in marking a material for a 22.5 degree miter cut with different edge references without having to reposition, and/or change an orientation of the tool 100.

The tool 100 also includes a plurality of screw hole guides 114*a*, 114*b*, 114*c* and 114*d*, which are arranged in pairs. The screw hole guides 114*a*-114*d* can be used to facilitate pre-drilling holes in decking boards prior to attachment to a corresponding sub-structure. In the tool 100, the screw hole guides 114*a* are located 1 inch from the edge 113*a* of the template portion 110, while the screw hole guides 114*b* are located 1.5 inches from the edge 113*a* of the template portion 110. Also in the tool 100, the screw hole guides 114*c* are located 1 inch from the edge 113*b* of the template portion 110, while the screw hole guides 114*d* are located in 1.5 inches from the edge 113*b* of the template portion 110, where the edge 113*b* is an opposite edge of the template portion 110 from the edge 113*a*. Precise placement of pre-drilled screw holes, e.g., at 1 inch or 1.5 inches from an end of a decking board, can be achieved using the tool 100 by aligning either the edge 113*a* or the edge 113*b* with the end of the board and pre-drilling holes using the appropriate screw hold guides. Such an arrangement also allows for flexibility in pre-drilling holes, e.g., precisely spaced from ends of decking boards, without having to flip and/or rotate the tool 100. In this example, the screw holes guides 114*b* and 114*d* are arranged in the shape of a square, while the screw hold guides 114*a* and 114*c* are arranged in the shape of rectangle. In some implementations, fewer or more screw hole guides can be included.

As further shown in FIG. 1, the 100 tool includes various markings 116. In this example, the markings 116 include indications of angles of the slots 112*a*-112*b*, spacing distances of screw hold guides 114*a*-114*d* from their respective reference edges of the template portion 110, and ruler markings situated along the edges 113*a*, 113*b* and 113*d*. In this example, the ruler markings are shown in inches. In other implementations, the ruler markings can be metric, e.g., centimeters. Further in this example, the markings 116 include an indication of a deck board spacing that can be implemented using the base portion 120. For instance, as shown in FIG. 1, the base 120 of the tool 100, as is described in further detail below, can be used to space decking boards with a ¼ inch spacing when the side of the template portion 110 shown in FIG. 1 is facing up, or away from a decking board on which the tool 100 is placed.

Referring to FIG. 2, a diagram illustrating a perspective view of the tool 100 of FIG. 1 is shown. In FIG. 2, additional detail of the base portion 120 that is not apparent in FIG. 1 is illustrated. For instance, in this example, the base portion 120 includes a surface 126 that faces away from the template portion 110 that is not planar, and has at least two different thicknesses. For instance, in the tool 100, the base portion 120 has a portion 122 that extends away from a first side of the template portion 110, e.g., the upward facing side of the template portion 110 as shown in FIG. 2. Also in this example, the base portion 120 has a portion 124 that extends away from a first side of the template portion 110, e.g., a downward facing side of the template portion 110, which is not visible in FIG. 2. In the tool 100, the second portion 124 of the base portion 120 has a thickness that is greater than a thickness of the portion 122. These different thicknesses can be used to appropriately space different kinds of decking material. For instance, one thickness can be used for spacing as natural wood decking material, while the other thickness can be used for spacing engineered, or composite decking materials. As shown in FIG. 2, a shoulder, or step 128 is disposed between the portion 122 and the portion 124 of the base portion 120, where the step 128 defines the change in thicknesses between the portion 122 and the portion 124.

FIGS. 3, 4 and 5 are diagrams illustrating, respectively, right-side, left-side and bottom-side views of the tool 100 of FIG. 1. As shown in FIGS. 3 and 4, the template portion is coupled with, and extends from the base portion 120, e.g., is arranged in a plane that is orthogonal to a plane of the base portion 120. FIGS. 3 and 4 also illustrate the surface 126 of the base portion 120, as well as the portions 122 and 124, and their respective, and relative thicknesses. FIGS. 3, 4 and 5 further illustrate the step 128, which is disposed between the portion 122 and the portion 124 of the base portion 120.

FIG. 6 is a diagram illustrating a top view of the tool 100 of FIG. 1. As shown in FIG. 6, the portion 122 of the base portion 120, e.g., the thinner portion of the base 120 in this example, extends away from a first side of the template portion 110, e.g., the downward facing side of the template portion 110 as shown in FIG. 6. As further illustrated in FIG. 6, the portion 124 of the base portion 120, e.g., the thicker portion of the base 120 in this example, extends away from a second side of the template portion 110, e.g., the upward facing, opposite side of the template portion 110 as shown in FIG. 6.

FIG. 7 is a diagram illustrating a back-side view of the tool 100 of FIG. 1. In the back-side view of the tool 100 shown in FIG. 6, the slots 112*a*-112*c* and the screw hole guides 114*a*-114*b* are arranged mirror image from their arrangement in the front-side view of the tool in FIG. 1. As also shown in FIG. 6, the illustrated side of the template portion includes markings similar to the markings 116 in FIG. 1. However, in the view shown in FIG. 6, the markings 116 on the template portion 110 include an indication of a deck board spacing that can be implemented using the base portion 120 that is different than shown in FIG. 1. For instance, as shown in FIG. 6, the markings indicate that the base 120 of the tool 100 can be used to space decking boards with a 3⁄16 inch spacing, e.g., using the portion 122 of the base portion 120, when the side of the template portion shown in FIG. 6 is facing up, or away from a decking board on which the tool 100 is placed.

Figure 8:
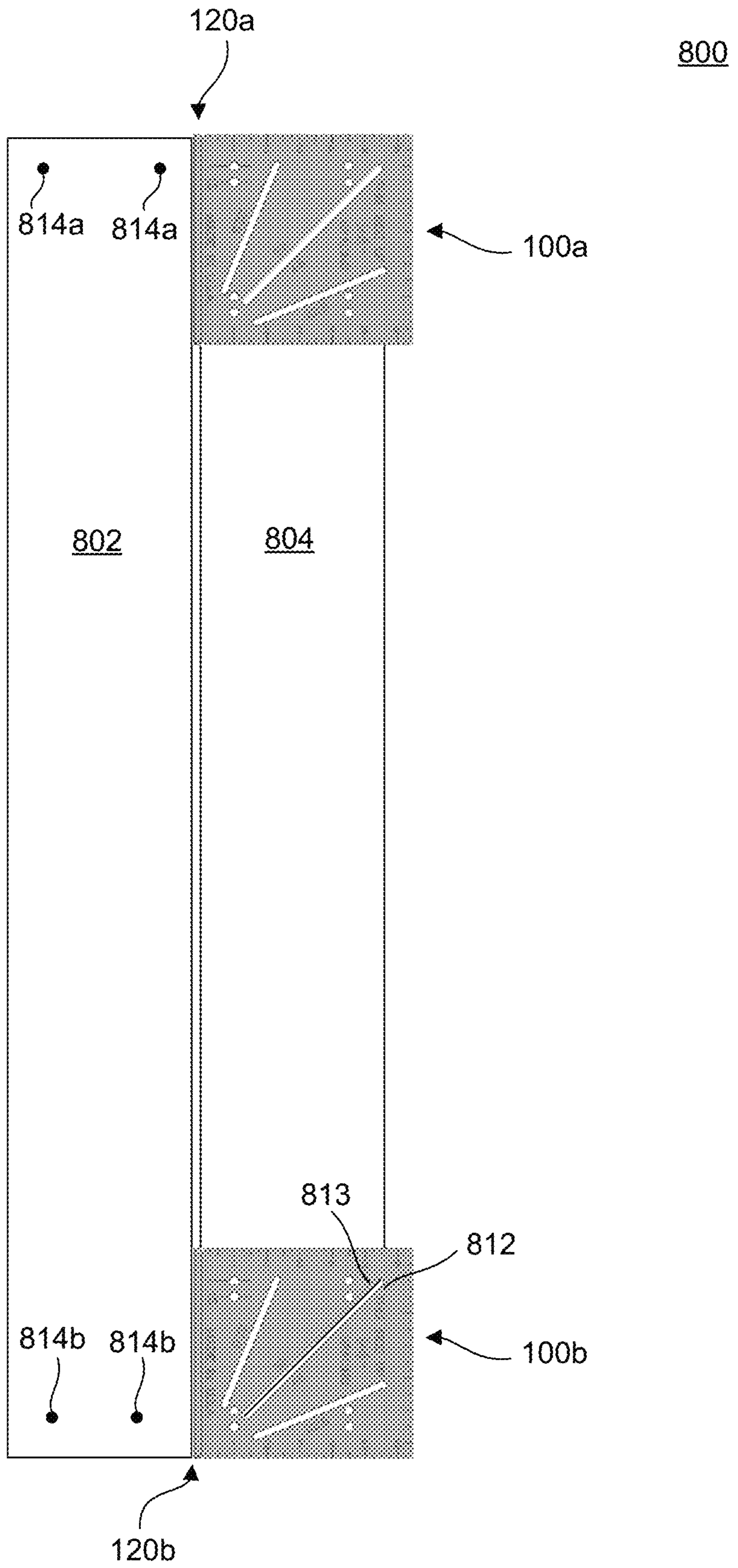
FIG. 8 is diagram schematically illustrating use of the tool of FIG. 1.

FIG. 8 is a diagram that schematically illustrates using implementations of the tool 100 of FIG. 1 for constructing a deck 800. Specifically, FIG. 8 schematically illustrates a portion of the deck 800, including deck boards 802 and 804. In example implementations, the deck boards 802 and 804 can, as part of the construction process, be attached to an underlying sub-structure (not shown). Such a substructure can include, e.g., a plurality of joists that provide structural support for the deck boards 802 and 804, as well as for additional deck boards.

As shown in FIG. 8, the deck board 802 is illustrated as having pairs of pre-drilled screw holes 814*a* and 814*b*, which can be formed using screw hole guides included in either the tool 100*a* or the tool 100*b*. That is, with the tool 100*a* or the tool 100*b* appropriately placed on the deck board 802, corresponding screw hole guides of the tool 100*a* or the tool 100*b* can be used to facilitate formation of the screw holes 814*a* and 814*b*, e.g., by inserting a bit of a power drill in the screw hole guides and using the inserted bit to form the screw holes. In some implementations, screw holes can also be similarly formed in the deck board 804. In this example, the tools 100*a* and 100*b* can be implementations of the tool 100 illustrated in FIGS. 1-7. For instance, as shown in FIG. 2, the bases 120*a* and 120*b* of the tools 100*a* and 100*b* can be used to space decking boards with a ¼ inch spacing, e.g., using base portions with ¼ inch thickness (e.g., base portion 124 of the tool 100). In an implementation, the deck boards 802 and 804 could be spaced with a different spacing (e.g., 3⁄16 inch) by inverting the tools 100*a* and 100*b* using base portions with 3⁄16 inch thickness (e.g., base portion 122 of the tool 100). The selected spacing (e.g., ¼ inch or 3⁄16) between the deck boards 802 and 804 that is achieved using the tools 100*a* and 100*b* can depend, at least in part, on a type of material of the deck boards 802 and 804.

As also shown in FIG. 8, in this example, the tools 100*a* and 100*b* are disposed on the deck board 804, such that appropriate portions of their respective base portion 120*a* and 120*b* extend between the deck boards 802 and 804 to facilitate accurate spacing of the deck boards 802 and 804 relative to one another when attaching the deck board 804 to the associated sub-structure. In another implementation, the tools 100*a* and 100*b* could, instead, be rotated 180 degrees and disposed on the deck board 802 when spacing the deck board 804 from the deck board 802.

As also shown in FIG. 8, a slot 812 can be used to facilitate marking a cut line 813, e.g., a 45 degree miter cut line, on the deck board 804. In an implementation, the deck board 804 can then be cut, using the cut line 813 as a guide. The deck board 804 could be marked and miter cut, for example, prior to placing it adjacent to the deck board 802. In some implementations, only a single one of the tools 100*a* and 100*b* could be used for performing the tasks described above with respect to FIG. 8.

Figure 9:
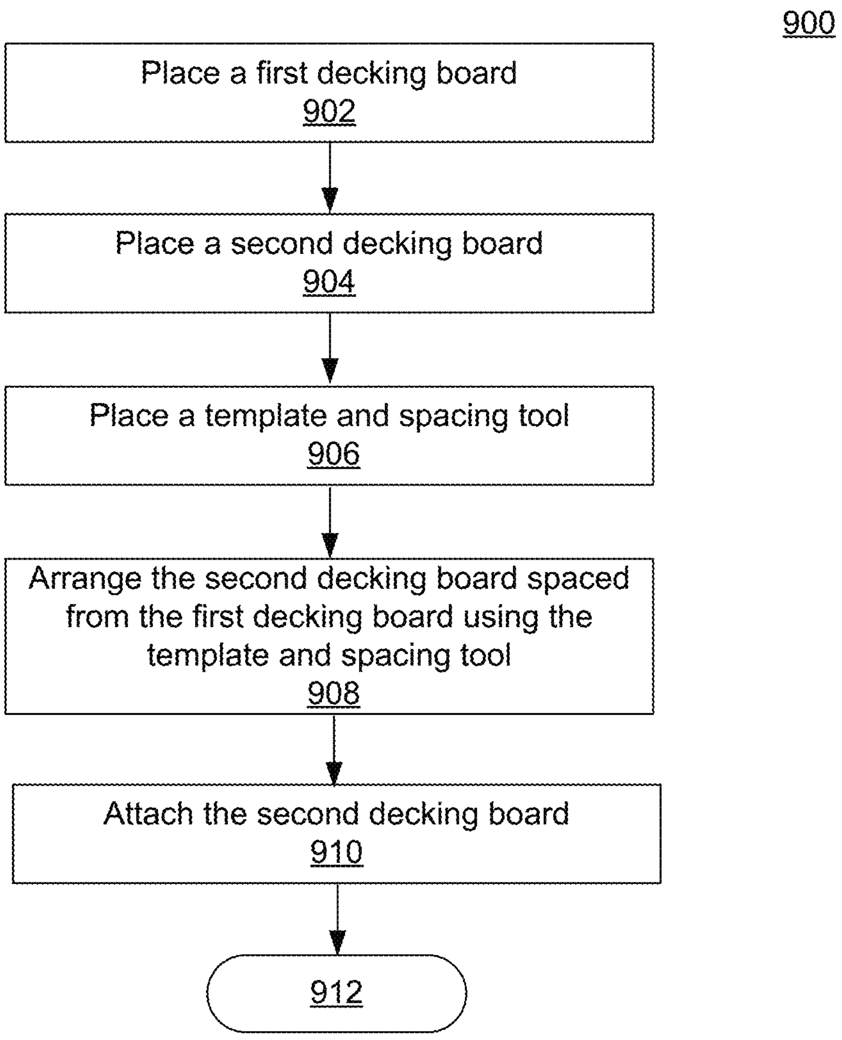
FIG. 9 is a flowchart illustrating a method of constructing a deck.

FIG. 9 shows an example of a method 900 for constructing a deck. The method 900 can be used with one or more other examples described elsewhere herein. More or fewer operations than shown can be performed. Two or more operations can be performed in a different order unless otherwise indicated.

At operation 902, the method 900 can include placing a first decking board in a desired position on a sub-structure of the deck. At operation 904, the method 900 can include placing a second decking board adjacent to the first decking board. At operation 906, the method 906 can include placing a planar template portion of a construction tool, e.g., such as the tool 100 (FIGS. 1-7) on an upper surface of the first decking board or an upper surface of the second decking board. In an implementation, the tool can be place such that a first portion of a base of the construction tool is disposed between an edge of the first decking board and an edge of the second decking board, and a second portion of the base extends away from the first decking board and the second decking board. As described herein, the first portion of the base can have a thickness that is different than a thickness of the second portion of the base.

At operation 908, the method 900 can include arranging the second decking board such that the edge of the first decking board is in contact with a first side of the first portion of the base and the edge of the second decking board is in contact with a second side of the first portion of the base. At operation 910, the method 900 can include, after arranging the second decking board, attaching the second decking board to the sub-structure of the deck.

In example implementations, the method 900 can include one or more of the following operations or aspects. For instance, the first decking board can be attached to the sub-structure of the deck prior to placing the second decking board adjacent to the first decking board at operation 904. Screw holes can be pre-drilled screw holes in the second decking board and/or the first decking board using a pair of screw hole guides defined in the planar template portion. The screw holes of the pair can each be at a same distance from an edge of the planar template portion. Attaching the second decking board to the sub-structure of the deck can include attaching the second decking board to the sub-structure with respective screws inserted in the pre-drilled screw holes.

Prior to attaching the second decking board to the sub-structure, a miter cut line can be marked on the second decking board using one of a plurality of slots defined in the planar template portion of the construction tool, and the second decking board can be miter cut based on the miter cut line. In an implementation, the first decking board can be miter cut using the same process.

In example implementations, placing the planar template portion of the construction tool can include identifying a type of material of the first and second decking boards, and selecting, based on the type of material, an orientation of the planar template portion, such that a thickness of the first portion of the base in the selected orientation corresponds with a desired spacing for the identified type of material. For instance, the selection can be based on whether the type of material is a wood material, a composite material, an engineering material, and so forth.

At operation 912, zero, one or more operations can be performed. In some implementations, the method 900 can end at operation 912, e.g. after performing the operations 902-912. In some implementations, some or all of the operations 502-510, as well as additional operations, can be performed at the operation(s) 510 regarding placing additional decking boards.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

In addition, the process flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

A number of implementations have been described. Nevertheless, it will be understood that various modifications may be made without departing from the spirit and scope of the specification.

While certain features of the described implementations have been illustrated and described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A construction tool comprising:

a template portion arranged in a first plane, the template portion including a plate having a slot defined therethrough, the plate being rectangular in shape, and the slot being configured to facilitate marking a cut line on a construction material; and a base portion being arranged in a second plane, the second plane being orthogonal to the first plane, the base portion having:

a first portion disposed on a first side of the plate of the template portion; and a second portion disposed on a second side of the plate of the template portion that is opposite the first side of the plate, the first portion of the base portion having a first thickness, the second side of the template portion including textual markings indicating the first thickness, and the second portion of the base portion having a second thickness that is different than the first thickness, the first side of the template portion including textual markings indicating the second thickness.

2. The construction tool of claim 1, wherein the slot is angled with respect to an edge of the plate opposite the base portion.

3. The construction tool of claim 1, wherein:

the slot is a first slot that is configured to facilitate marking a 45 degree miter cut line; and the plate of the template portion further has a second slot defined therein, the second slot being configured to facilitate marking a first 22.5 degree miter cut line.

4. The construction tool of claim 3, wherein the plate of the template portion further has a third slot defined therein, the third slot being configured to facilitate marking a second 22.5 degree miter cut line, the first slot being angularly disposed between the second slot and third slot.

5. The construction tool of claim 1, wherein the rectangular shape of the plate of the template portion is a square.

6. The construction tool of claim 1, wherein:

the first portion of the base portion is configured for spacing decking material of a first type;

the second portion of the base portion is configured for spacing decking material of a second type; and the base portion includes a step between its first portion and its second portion.

7. The construction tool of claim 1, wherein the plate of the template portion further has a plurality of screw hole guides defined therein, the plurality of screw hole guides being configured to facilitate pre-drilling screw holes for mounting decking material.

8. The construction tool of claim 7, wherein the plurality of screw hole guides includes:

a first pair of screw hole guides, each screw hole guide of the first pair being disposed at a first distance from an edge of the plate of the template portion; and a second pair of screw hole guides, each screw hole guide of the second pair being disposed at a second distance from the edge of the plate of the template portion, the second distance being greater than the first distance.

9. The construction tool of claim 8, wherein the edge of the plate of the template portion is a first edge of the plate of the template portion, the plurality of screw hole guides further including:

a third pair of screw hole guides, each screw hole guide of the third pair being disposed at the first distance from a second edge of the plate of the template portion that is opposite the first edge of the plate of the template portion; and a fourth pair of screw hole guides, each screw hole guide of the fourth pair being disposed at the second distance from the second edge of the plate of the template portion.

10. A construction tool comprising:

a template portion arranged in a first plane, the template portion including a plate that is rectangular in shape, the plate having:

a first slot defined therein, the first slot being configured to facilitate marking a cut line at a first angle on a construction material;

a second slot defined therein, the second slot being configured to facilitate marking a cut line at a second angle on the construction material; and a plurality of screw hole guides defined therein, the plurality of screw hole guides being configured to facilitate pre-drilling screw holes in the construction material, the plurality of screw hole guides including:

a first pair of screw hole guides, each screw hole guide of the first pair being disposed at a same first distance from an edge of the plate of the template portion; and a second pair of screw hole guides, each screw hole guide of the second pair being disposed at a same second distance from the same edge of the plate of the template portion as the first pair of screw hold guides, the second distance being greater than the first distance; and a base portion arranged in a second plane, the second plane being orthogonal to the first plane, the base portion having:

a first portion disposed to a first side of the plate of the template portion; and a second portion disposed to a second side of the plate that is opposite the first side of the plate, the first portion of the base portion having a first thickness, and the second portion of the base portion having a second thickness that is greater than the first thickness.

11. The construction tool of claim 10, wherein the plate of the template portion further has a third slot defined therein, the third slot being configured to facilitate marking a miter cut line at a third angle on the construction material.

12. The construction tool of claim 11, wherein:

the first slot is arranged along a 45 degree diagonal in the plate of the template portion;

the second slot is arranged at a 22.5 degree angle with a first edge of the plate of the template portion; and the third slot is arranged at a 22.5 degree angle with a second edge of the plate of the template portion, the second edge of plate of the template portion being at a 90 degree angle with the first edge of the plate of the template portion.

13. The construction tool of claim 10, wherein the edge of the plate of the template portion is a first edge of the plate of the template portion, the plurality of screw hole guides further including:

a third pair of screw hole guides, each screw hole guide of the third pair being disposed at the first distance from a second edge of the plate of the template portion that is opposite the first edge of the plate of the template portion; and a fourth pair of screw hole guides, each screw hole guide of the fourth pair being disposed at the second distance from the second edge of the plate of the template portion.

14. The construction tool of claim 10, wherein the base portion is monolithically integrated with the template portion.

* * * * *